Patented Jan. 25, 1938

2,106,158

UNITED STATES PATENT OFFICE 2,106,158

PURIFYING CHLORINATED HYDROCARBONS

Friedrich Povenz, Rheinfelden/Baden, and Alfred Rieche, Wolfen, Kreis Bitterfeld, Germany, assignors to I. G. Farbenindustrie Aktiengesellschaft, Frankfort-on-the-Main, Germany No Drawing. Application June 18, 1936, Serial No. 85,916. In Germany July 4, 1935

3 Claims. (Cl. 260—162)

The present invention relates to a process for purifying chlorinated hydrocarbons.

The chlorine derivatives of many aliphatic hydrocarbons, particularly those of methane, acetylene, ethylene and ethane, have a tendency to decompose which is particularly noticeable as a development of an acid reaction during storage. Even a product which has been carefully distilled possesses this tendency in a more or less high degree.

In order to limit as far as possible this property which for practical purposes is disadvantageous in the chlorohydrocarbons, it has been a practice to add to the materials so-called stabilizers, the action of which depends on a tendency to counteract a production of hydrogen chloride. Obviously, the effect of these stabilizers is limited in period of time, the more so as the stabilizer during the many operations which the material undergoes in practice, for example, during distillation, is more or less removed.

The present invention is based on the observation that the decomposition of chlorinated hydrocarbons is favoured by the presence of small proportions of the chlorides of metals, for example, iron chloride or zinc chloride. Metal chlorides have the further unpleasant property that they act injuriously owing to catalytic effect in various reactions in which the halogen hydrocarbon is used as solvent, for instance, in chlorinations. These metal chlorides, the formation of which is quite unavoidable in the production of chlorinated hydrocarbons, cannot be completely removed by distillation or washing with alkali or acid or by absorption agents.

The invention consists in a process of removing in a very simple manner these metal salts from the chlorinated hydrocarbon by treating the latter with a body of the type of ethylene oxide, preferably in the presence of a small proportion of water. In this manner the metal salts are precipitated in a non-volatile form, presumably as hydroxides or basic salts which, unlike chlorides, can be separated by subsequent distillation of the hydrocarbon or by union with an adsorbing agent such as alumina, charcoal or the like, or by a combination of these processes or finally by suitable filtration, so that chlorohydrocarbon free from metal salts is obtained. The fact that ethylene oxide can form their hydroxides in aqueous solutions of metal salts is in itself known. The application of this reaction of ethylene oxide for purification of chlorinated hydrocarbons is, however, new and surprising. The most probable explanation of the effect of compounds of the type of ethylene oxide in contrast with that of the known agents such as alkalis is that the ethylene oxide dissolves as an organic compound in the chlorinated hydrocarbon and is thus in a position to decompose any molecular compound between the metal salt and the chlorohydrocarbon which may be present. Suitable agents of the kind in question are ethylene oxide and its homologues and its substitution products, for instance, epichlorhydrin, phenyl ethylene oxide, phenoxy propene oxide.

The following example illustrates the invention:

Gaseous ethylene oxide is passed into the chlorinated hydrocarbon or a liquid compound of the ethylene oxide type is added to the chlorinated hydrocarbon. The proportion of the ethylene oxide used depends on the amount of metal salt contained in the chlorinated hydrocarbon. The chlorinated hydrocarbon is then distilled in the presence of a small quantity of water or in a current of steam. Alternatively the ethylene oxide may be introduced during the distillation. Preferably there is added an adsorption agent, for instance precipitated alumina, activated charcoal or the like, in order to bind the finely divided metal compound formed. It is also practicable to remove the precipitated matter from the chlorohydrocarbon which has been treated with ethylene oxide by filtration if desired after addition of an adsorbing agent. The chlorohydrocarbon thus purified is completely neutral and retains its neutrality even after long standing and even in the presence of light, air or moisture, and when a halogen hydrocarbon thus treated is used as a solvent, for instance in a chlorination, it is found that the disadvantages of a catalytic effect of the metal salt has disappeared. This elimination of metal salts from chlorinated hydrocarbons is therefore a considerable advance in the technical applicability of the chlorinated hydrocarbon.

As chlorinated hydrocarbons which may be stabilized in the manner described above, there may be mentioned trichlorethylene, dichlorethylene, tetrachlorethane, trichlorethane.

In the example given above, the purification may be carried out in employing homologues of ethylene oxide, such as propylene oxide or butylene oxide or another alkylen oxide instead of ethylene oxide. Substitution products, such as phenyl ethylene oxide, phenoxypropene oxide or finally epichlorhydrin, are likewise suitable for the process set forth.

What we claim is:—

1. The process for purifying halogenated hydrocarbons of the group consisting of halogenated methane, ethane, ethylene and acetylene which are contaminated with metal chlorides, which comprises converting the metal salt by addition of a compound containing the molecular configuration

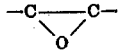

of the group consisting of alkylene oxides, phenylalkylene oxides, phenoxypropene oxide and epichlorhydrin with simultaneous action of water into a non-volatile substance and separating the latter from the halogenated hydrocarbons.

2. The process for purifying halogenated hydrocarbons of the group consisting of halogenated methane, ethane, ethylene and acetylene which are contaminated with metal chlorides, which comprises adding ethylene oxide to the chlorinated hydrocarbon and distilling the latter in the presence of water.

3. The process for purifying halogenated hydrocarbons of the group consisting of halogenated methane, ethane, ethylene and acetylene which are contaminated with metal chlorides, which comprises adding ethylene oxide to the chlorinated hydrocarbon and distilling the latter in the presence of water and of an adsorption agent.

FRIEDRICH POVENZ.
ALFRED RIECHE.